Aug. 19, 1969  C. BERGER ET AL  3,462,314
PRODUCTION OF ION EXCHANGE MEMBRANE
Filed May 26, 1965
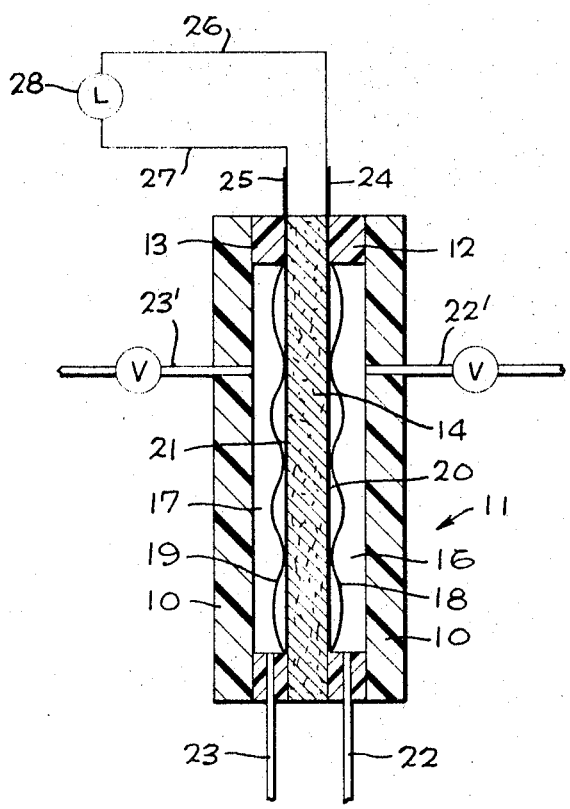
CARL BERGER
FRANK C. ARRANCE
INVENTORS
BY *Mat Gerdin*
ATTORNEY United States Patent Office 3,462,314
Patented Aug. 19, 1969

3,462,314
PRODUCTION OF ION EXCHANGE MEMBRANE
Carl Berger, Santa Ana, and Frank C. Arrance, Costa Mesa, Calif., assignors, by mesne assignments, to Mc-Donnell Douglas Corporation, Santa Monica, Calif., a corporation of Maryland
Filed May 26, 1965, Ser. No. 458,855
Int. Cl. H01m 3/02
U.S. Cl. 136—153                                    12 Claims

ABSTRACT OF THE DISCLOSURE

Method of forming an ion conducting membrane, particularly adapted as a fuel cell membrane, by sintering a mixture of a substance selected from the group consisting of water insoluble hydrous metal oxides and water insoluble acid salts, such as hydrous zirconium dioxide, and an inorganic acid, e.g., phosphoric acid when such substance is a hydrous metal oxide, and a water balancing agent such as an aluminosilicate, treating the sintered mixture with an inorganic acid such as phosphoric acid, and resintering the so-treated sintered material, to provide an ion conducting membrane having low electrical resistance and substantially increased transverse strength.

---

This invention relates to ion exchange membranes which are particularly useful in fuel cells, and is especially concerned with novel procedure for the production of ion exchange membranes having high strength and good conductivity, to novel high strength highly conductive ion exchange membranes, and to fuel cells embodying same.

The term fuel cell applies to an electrochemical cell in which chemical energy is converted into electrical energy by means of reactants consisting of fuel and oxidizer fed continuously into the cell from external sources. Oxidation occurs at the anode and reduction takes place at the cathode. In the most well known type of fuel cell, known as the hydrogen-oxygen fuel cell, hydrogen constitutes the fuel and is oxidized to the hydrogen ion at the anode, and the hydrogen ion migrates through the cation-selective electrolyte to the cathode where it combines with hydroxyl ions formed by reduction of the oxygen or oxidizer at the cathode. Hydrocarbon fuel cells in which hydrocarbon fuels are oxidized by means of oxygen to produce an electric current, and other types of fuel cells such as ammonia and hydrazine fuel cells, are shown also.

One of the important problems in the production of ion exchange membranes and particularly inorganic ion exchange membranes for use in fuel cells of the above types, is the production of ion exchange membranes of sufficient strength to withstand sudden shocks and to retain their physical integrity over an extended period of time, without disintegration, especially since such feul cell membranes generally have a relatively thin transverse suction. This problem is rendered still more difficult because any improvement or increase in transverse strength of the ion exchange membrane must be made without any significant sacrifice of the conductivity of the membrane.

It is accordingly one object of the invention to provide novel procedure for the production of ion exchange membranes having substantially increased transverse strength, and which are especially useful in fuel cells.

Another object is to provide procedure for readily producing high strength inorganic ion exchange membranes having good electrical conductivity, and which are particularly useful in fuel cells, e.g. hydrogen-oxygen and hydrocarbon fuel cells.

Still another object of the invention is the provision of procedure for producing efficient inorganic ion exchange membranes, for example, zirconium phosphate membranes, having high physical integrity, strength and cohesiveness, and having high ionic conductivity, particularly when employed in fuel cells using gaseous or liquid fuel such as hydrogen, ammonia, hydrocarbons and the like.

A still further object is to provide improved ion exchange membranes having the characteristics noted above including high transverse strength and good ionic conductivity, and the provision of improved fuel cells incorporating such improved ion exchange membranes of high strength and high conductivity.

Other objects and advantages of the invention will appear hereinafter.

The above objects and advantages are achieved according to the invention and an ion exchange membrane of high strength and high ionic conductivity provided, and especially suited for application in fuel cells, by sintering a mixture of a substance selected from the group consisting of water insoluble hydrous metal oxides and water insoluble acid salts, an inorganic acid when said substance is said hydrous metal oxide, and a material referred to herein as a water balancing agent, and described more fully hereinafter, treating said sintered mixture with an inorganic acid, e.g., phosphoric acid, and resintering the so-treated sintered material. The steps following the initial sintering operation including the acid treatment and particularly the resintering operation constitute important novel features of the invention resulting in the improved high strengh highly conductive ion exchange membrane of the invention.

Thus, inorganic ion exchange membranes are produced according to the novel invention procedure which have a transverse strength of at least about 4000 p.s.i. and which can range from about 4000 to about 7000 p.s.i. The high strength ion exchange membranes thus formed have good to excellent ionic conductivity. Thus, for example, the ion exchange membranes produced according to the invention can have a resistance of less than about 20 ohm/cm.$^2$ at 25° C., e.g., ranging from about 3 to about 20 ohm/cm.$^2$, and often less than about 10 ohm/cm.$^2$, at 25° C. On the other hand inorganic ion exchange membranes produced by prior art procedure have a transverse strength ranging generally from about 500 to about 2500 p.s.i. and a conductivity corresponding to a resistance of about 50 to about 150 ohm/cm.$^2$.

The membranes produced according to the invention procedure and of high strength and high conductivity have been found to be particularly advantageous for use in fuel cells, particularly hydrogen-oxygen and hydrocarbon fuel cells at varying temperatures. Thus, for example, such ion exchange membranes have functioned efficiently in hydrogen-oxygen fuel cells at temperatures of the order of 65° C. and also function satisfactorily in hydrocarbon fuel cells operating at temperatures of the order of 100 to 125° C.

One of the starting materials employed according to the invention procedure for producing the ion exchange membrane is a water insoluble hydrous metal oxide. Examples of such hydrous oxide ion exchange or ion conducting materials which can be employed according to the invention procedure preferably include the insoluble hydrous oxides of zirconium, titanium, antimony, tungsten, silicon, scandium, bismuth, vanadium, molybdenum, chromium and aluminum. The term "insoluble hydrous metal oxides" includes those water-insoluble solids containing one or more metal cations, oxideions, hydroxide ions, and an indeterminate quantity of water, and includes hydrous hydroxides. Such hydrous metal oxides do not necessarily have a definite stoichiometric combination or a definite crystal structure and they may contain ionic impurities as well. Examples of additional hydrous metal oxides are given in applicants' copending application Ser. No. 326,709, filed Nov. 29, 1963, and such disclosure is incorporated herein by reference.

Also, insoluble inorganic acid salts can be employed as ion conducting starting material in the invention procedure to form ion exchange membranes. In general, insoluble acid salts such as the insoluble phosphates, borates, sulfates, tungstates, molybdates, phosphomolybdates and vanadates can be employed. The cation of such acid salts include metals such as zirconium, titanium, antimony, tin, tungsten, thorium and vanadium. The acid phosphates are preferred, and examples of preferred specific insoluble acid salts include zirconium phosphate, zirconium sulfate, titanium molybdate, titanium phosphate, tin phosphate, thorium phosphate, and the like.

The preferred starting materials according to the invention procedures are the insoluble hydrous metal oxides. When such starting materials are employed, such material is mixed with an inorganic acid prior to the initial sintering operation. Such inorganic acids can be any of those used to form the above noted acid salts, and including phosphoric acid, boric acid, molybdic acid, phosphomolybdic acid, tungstic acid, and sulfuric acid. The acid, preferably phosphoric acid, can be employed in stoichiometric amount with respect to the hydrous metal oxide, such as hydrous zirconium dioxide, to form the corresponding acid salt, e.g., zirconium phosphate, but an excess of oxide or acid can be used.

According to one mode of operation, approximately equal parts by weight of the metal oxide and acid can be used.

As previously noted in the invention procedure there is incorporated with the ion conducting material, a so-called water balancing agent. These water balancing agents are inorganic additives of controlled water vapor characteristics capable of retaining water and providing suitable water vapor pressure especially at temperatures above 100° C. when such ion exchange membranes are incorporated in a fuel cell.

Any water balancing agent can be incorporated in the ion exchange or ion conducting material which will balance the amount of water in the membrane at a given temperature, and particularly at temperatures above 100° C., to provide maximum conductivity of such membrane at such temperature. Thus, water balancing agents can be employed which when present in an inorganic membrane incorporated in a fuel cell provide a water vapor pressure of from about 10 to about 200 mm. at 100° C. and atmospheric pressure. Examples of suitable water balancing agents which can be employed together with the ion conducting material in the invention procedure include aluminosilicates, activated alumina, aluminum sulfate, silicic acid, colloidal silica, silica gel, phosphorus pentoxide, copper sulfate, ammonium acid phosphate and calcium chloride. The preferred water balancing agents for purposes of the invention are the aluminosilicates such as those marketed as Zeolite, Zeolon and the like, and including, for example, sodium and potassium aluminosilicates, and magnesium, calcium, barium and strontium aluminosilicates. These materials can be used separately, but often mixtures of these aluminosilicates are used, for example, complex mixtures of both the alkali metal and alkaline earth metal aluminosilicates.

Ion exchange membranes containing a water balancing agent of the type described above, are described and claimed in the copending application Ser. No. 405,079 filed Oct. 20, 1964, of Carl Berger and Andrew D. Kelmers.

According to preferred procedure for carrying out the invention process, a mixture of ion conducting material as defined above, preferably hydrous metal oxide, particularly hydrous zirconium dioxide, an inorganic acid as described above, preferably phosphoric acid, and a water balancing agent, preferably an aluminosilicate, is provided. Although various proportions of these materials can be employed the amount of ion conducting material such as hydrous metal oxide, e.g. hydrous zirconium dioxide, can range from about 10 to about 80 parts, the amount of acid component, e.g. phosphoric acid, can range from about 10 to about 50 parts, based on 100% acid, and the amount of water balancing agent, e.g. an aluminosilicate, can range from about 5 to about 50 parts, by weight. The amount of water balancing agent present in the composition can range from about 1 to about 60%, preferably from about 5 to about 50%, by weight. According to one preferred embodiment each of these components can be employed in equal amount, so as to provide a 1:1:1 mixture by weight of the three components.

The mixture of the above three components including hydrous metal oxide, inorgnic acid and water balancing agent in suitable proportion as described above, is then formed into membranes, preferably by compacting such mixture at pressures e.g. of the order of about 2,000 to about 10,000 p.s.i. The resulting preferably compacted mixture or membrane is then sintered at temperatures ranging from about 200 to about 1,000° C., preferably between about 300 and about 600° C. The sintered membrane after cooling is then treated or saturated with an inorganic acid of the types described above, preferably phosphoric acid, and the so-treated sintered membrane is then resintered. Such resintering operation is also generally carried out at temperatures ranging from about 200 to about 1,000° C. preferably about 300 to about 600° C. It is understood that the above noted sintering temperatures are illustraive only and that sintering temperaures outside the above range can be employed under the appropriate conditions, particularly depending upon the composition of the mixture of materials being sintered.

As previously noted it has been found that the acid treatment and resintering operations following the initial sintering, greatly enhance the transverse strength of the initially sintered membrane by a factor of about 2 or more, with the additional surprising result that the ionic conductivity or conversely the electrical resistance, of the resulting membrane of enhanced strength is not adversely affected by such operations.

In the invention procedure described above it is believed that the hydrous metal oxide reacts with the inorganic acid in the preferred initial starting mixture to form the corresponding insoluble acid salt. However, it will be understood that the ion exchange membrane following the sintering operation can contain some of the inorganc metal oxide material. It is further believed that in the ion exchange membrane produced according to the invention there is increased coordination bonding between the acid salt e.g. zirconium phosphate, of the ion exchange matrix, and the water balancing agent, e.g. aluminosilicate, as compared to prior art ion exchange membranes, thus aiding to confer improved strength and conductivity characteristics on the membranes hereof. However, the invention is not to be taken as limited by any theory of the function or mode of operation of the components of the in exchange membrane.

It will be understood that since in the above described preferred mode of procedure, wherein hydrous metal oxide and inorganic acid are employed in the starting material, the sintering operation will result in the formation of an insoluble acid salt, e.g., phosphate, such as zirconium phosphate, such acid salt or acid phosphate per se can be employed as starting material, as previously noted, in place of the mixture of hydrous metal oxide and inorganic acid. Thus, for example, instead of employing a mixture of hydrous zirconium dioxide and phosphoric acid as starting materials, the corresponding acid salt, e.g., zirconium phosphate, can be employed, and this material, together with the water balancing agent, e.g., aluminosilicate, can be subjected to the above noted initial sintering operation. However, it has been found preferable to employ the insoluble hydrous metal oxide together with the inorganic acid as starting materials rather than the corresponding acid salt, since it has been observed from experience that the resulting ion exchange membrane is of higher strength than when employing the acid salt per se as starting material.

Following the initial sintering operation, treatment of the initially sintered membrane with an inorganic acid as described above is carried out preferably at about ambient temperature, although such temperature of treatment can be varied. The amount of inorganic acid employed preferably is that which is sufficient to substantially saturate the initially sintered membrane, thus then an amount of about 1 to about 20% of inorganic acid, e.g., phosphoric acid or boric acid, by weight of sintered material can be employed, such range being merely illustrative. Such treatment of the initially sintered membrane with inorganic acid is believed to provide strong bonding of the insoluble acid salt, e.g., zirconium phosphate, and the water balancing agent, e.g., aluminosilicate, present in the initially sintered membrane.

The final membrane produced following the second or resintering step contains the insoluble acid salt and the water balancing agent bonded in such manner that the resulting membrane has unusually high transverse strength, together with highly conductive ionic characteristics.

The accompanying drawing illustrates incorporation of an ion exchange membrane produced according to the invention in a fuel cell, e.g., a hydrogen-oxygen or a hydrocarbon fuel cell. The showing in the drawing is exaggerated for purposes of greater clarity.

Referring to the drawing the fuel cell 11 comprises a pair of back plates 10 which when assembled hold together a pair of adjacent neoprene gaskets 12 and 13 with the ion exchange membrane of enhanced strength and conductivity according to the invention, designated 14, sandwiched between the gaskets 12 and 13. In this embodiment the ion conducting membrane 14 is composed of zirconium phosphate containing an aluminosilicate as a water balancing agent, produced according to the invention procedure. The assembly of members 10, 12, 13 and 14 can be accomplished by use of any suitable adhesive or glue.

The central portion of the ion conductiong membrane 14 is covered or coated with a platinum black catalyst on both sides of the membrane, indicated at 20 and 21. Prior to assembly of members 10, 12, 13 and 14, tantalum screens 18 and 19 impregnated with platinum black, and preferably also teflon for waterproofing purposes, are placed in the central portion of gaskets 12 and 13, respectively, with the peripheral edges of the screen positioned between membrane 14 and the respective gaskets 12 and 13. Following assembly of the above noted parts, it will be seen that chambers 16 and 17 are formed on opposite sides of the ion conducting membrane 14, chamber 16 containing the screen 18 and the catalyst electrode 20, and chamber 17 containing screen 19 and the catalyst electrode 21. The screens 18 and 19 are of a corrugated or mesh material.

The fuel cell 11 is provided with a valved inlet 22′ to chamber 36 for passage of an oxidizer, e.g., oxygen gas, into such chamber, and a valved inlet 23′ to chamber 17, for passage of hydrogen in the case of a hydrogen-oxygen fuel cell, or a hydrocarbon, e.g., ethane, in the case of hydrocarbon fuel cell, into such chamber. A first conduit 22 which passes through gasket 12 and communicates with chamber 16, serves for removal of excess water and excess oxygen gas from chamber 16, and a second conduit 23 which passes through the gasket 13 and communicates with the opposite gas chamber 17, serves as an outlet for excess hydrogen, or for excess hydrocarbon and carbon dioxide in the case of a hydrocarbon fuel cell, from chamber 17. Terminals 24 and 25 are connected respectively to the tantalum screens 18 and 19, such terminals extending exteriorly of the fuel cell. Terminals 24 and 25 are connected in an external circuit including the electrical wires 26 and 27 and a load indicated at 28.

Where the fuel cell described above is employed as a hydrogen-oxygen fuel cell, hydrogen in chamber 17 reacts at the catalyst electrode or anode 21 and is oxidized to form hydrogen ion which migrates through the ion conducting membrane 14 and reacts with hydroxyl ion adjacent the catalyst electrode or cathode 20, which hydroxyl ion is formed by reduction of the oxygen in chamber 16 at such catalyst electrode or cathode, forming water.

Following are examples of practice of the invention.

Example 1

A mixture of equal parts of each of the three components hydrous zirconium dioxide, phosphoric acid (as 85% $H_3PO_4$) and Zeolon H (an aluminosilicate) is prepared. The mixture is compacted under a pressure of about 15 tons and is formed into thin discs. The thin compacted membranes are then sintered at temperature of about 400° C. for about 5 hours. The transverse strength of the resulting membranes are of the order of about 2500 p.s.i.

The sintered membranes are then saturated with phosphoric acid (85% $H_3PO_4$) and resintered at 500° C. for about 2 hours. This treatment increases the transverse strength of the resintered membranes to about 5500 p.s.i. and the resulting membrane has a resistance less than 10 ohms/cm.² at 25° C.

When such a membrane is employed as the membrane 14 in a hydrogen-oxygen fuel cell as described above and illustrated in the drawing, the fuel cell operate effectively at 0.5 volt and a current density of about 30 ma./cm.²

Example 2

The procedure of Example 1 above is repeated except that hydrous scandium oxide is substituted for hydrous zirconium dioxide, and employed in the same weight proportion as the zirconium dioxide of Example 1.

The resulting membrane has high transverse strength in excess of about 5,000 p.s.i. and low internal resistance less than about 20 ohm/cm.² at 25° C., and when incorporated in a hydrogen-oxygen fuel cell similar to that described above and shown in FIG. 2, results similar to those of Example 1 are obtained.

Example 3

A mixture of two parts of hydrous aluminum oxide, one part of boric acid and one part of Zeolon H is formed and granulated. This mixture is compacted and pressed into discs by application of a pressure of about 10,000 p.s.i. The resulting discs are then sintered at temperature of about 350° C.

The sintered membranes are then saturated with boric acid employing about 0.05 part of a saturated boric acid solution per part by weight of sintered membrane material, and the resulting mixture is resintered at about 450 to about 550° C.

The resulting membrane has a transverse strength of about 5,000 to about 6,000 p.s.i. and low internal resistance when incorporated as a membrane in a fuel cell as described above and shown in the drawing. Such fuel cell operates effectively.

Example 4

The procedure of Example 3 is substantially repeated except that in place of Zeolon H, the same weight proportion of colloidal silica is employed. Also, in the acid treatment step following the first sintering operation the sintered membrane is saturated with phosphoric acid instead of with boric acid.

The resulting membrane has a transverse strength of about 5,000 to about 6,000 p.s.i. and when incorporated in a hydrogen-oxygen fuel cell of the type illustrated in the drawing has low internal resistance and operates effectively.

Example 5

An ion exchange membrane prepared as in Example 1 is employed as the membrane in a fuel cell as described above and illustrated in the drawing, operating on hydrocarbon fuels such as ethane, propane and butane. The fuel cell operates effectively at temperatures ranging from about 100 to about 125° C. at open circuit voltages ranging from about 0.5 to about 0.6 volt and at a current density at 0.25 volt ranging from about 6 to about 15 ma./cm.$^2$.

Example 6

A mixture of about 60% hydrous titanium dioxide by weight, 25% by weight of phosphoric acid and 15% by weight of Zeolon H are mixed and granulated. The mixture is compacted under high pressure into the form of thin discs or membranes, and such membranes are then sintered at temperature of about 500° C. The resulting sintered membranes have a transverse strength ranging from about 5,000 to about 6,000 p.s.i.

The resulting sintered membranes are then saturated with phosphoric acid employing about 0.1 part of phosphoric acid per part of sintered membrane material, by weight, and the mixture resintered at about 500° C.

The resulting membrane has a transverse strength in excess of about 4,000 p.s.i. and has low internal resistance less than about 20 ohm/cm.$^2$ at 25° C. and operates effectively when incorporated as an ion exchange membrane in a hydrogen-oxygen fuel cell of the type described above and illustrated in the drawing.

Example 7

The procedure of Example 6 is repeated except that the Zeolon H is replaced by an equivalent weight proportion of silica gel, and following the initial sintering operation the sintered membrane is mixed with molybdic acid instead of phosphoric acid.

An ion exchange membrane having properties similar to that produced in Example 6 is obtained, which when employed in a hydrogen-oxygen fuel cell operates effectively, similarly to the ion exchange membrane of Example 6.

Example 8

A mixture of equal parts by weight of each of hydrous molybdenum oxide, phosphoric acid and Zeolon H is prepared and granulated. Such mixture is compacted under high pressure into thin membranes which are sintered at temperature of the order of 400 to 500° C. The sintered membranes are then saturated with phosphoric acid and resintered at temperatures of about 500 to about 550° C.

The resulting membranes have high transverse strength in excess of about 4,000 p.s.i. and are of low internal resistance less than 20 ohm/cm.$^2$ at about 25° C., and when incorporated in a hydrogen-oxygen fuel cell of the type described above and illustrated in the drawing, operate effectively therein.

Example 9

The procedure of Example 8 is repeated except that tungstic acid is employed in place of phosphoric acid, and activated alumina in equivalent proportion is employed in place of Zeolon H.

The resulting membrane has high transverse strength and low internal resistance similar to the membranes produced in Example 8 and when employed in a hydrogen-oxygen fuel cell as described above and illustrated in the drawing, operates effectively as in the case of the membrane of Example 8.

Example 10

A mixture of zirconium phosphate and Zeolon H in a proportion by weight of about 2 to about 1 is provided and such mixture granulated. The resulting granulated mixture is compacted into the from of thin membranes and such membranes are sintered at temperatures of about 400° C. The resulting membranes are then saturated with 85% phosphoric acid and resintered at about 500° C.

The transverse strength and internal resistance of these membranes is comparable to that of the membranes of Example 1, except that the transverse strength of the membranes produced in the present example is somewhat less and of the order of about 4,000 to about 5,000 p.s.i. as compared to a transverse strength of about 5,500 p.s.i. for the membranes of Example 1.

The membranes of the present example when employed in a hydrogen-oxygen fuel cell as described above and illustrated in the drawing, produce results similar to those produced in Example 1.

From the foregoing, it is seen that by means of the novel procedure of the invention by which the original material which is sintered, is then treated with acid to provide additional bonding and the resulting acid treated material is further sintered, ion conducting or ion exchange membranes are provided which have substantially increased transverse strength over that of the initially sintered material while unexpectedly possessing low electrical resistance, rendering such membranes highly effective for use in fuel cells, particularly hydrogen-oxygen and hydrocarbon fuel cells.

It will be understood that various modifications and adaptations of the invention can be made by those skilled in the art without departing from the spirit of the invention, and accordingly the invention is not to be taken as limited except by the scope of the appended claims.

We claim:

1. The method of forming a high strength ion conducting membrane which comprises sintering a mixture of a substance selected from the group consisting of water insoluble hydrous metal oxides and water insoluble acid salts, an inorganic acid when said substance is said hydrous metal oxide, and a material which retains a sufficient amount of water and provides a water vapor pressure of about 10 to about 200 mm., at temperatures of about 100° C. when said membrane is incorporated in a fuel cell, treating said sintered mixture with an inorganic acid, and resintering the so-treated sintered material.

2. The method of forming a high strength ion conducting membrane which comprises sintering a mixture of a substance selected from the group consisting of water insoluble hydrous metal oxides and water insoluble acid salts, an inorganic acid when said substance is said hydrous metal oxide, and a material selected from the group consisting of an alumino-silicate, activated alumina, aluminum sulfate, silicic acid, colloidal silica, silica gel, phosphorus pentoxide, copper sulfate, ammonium acid phosphate and calcium chloride, treating said sintered mixture with an inorganic acid, and resintering the so-treated sintered material.

3. The method of forming a high strength ion conducting membrane which comprises sintering a mixture of a substance selected from the group consisting of water insoluble hydrous metal oxides and water insoluble acid salts, an inorganic acid when said substance is said hydrous metal oxide, said inorganic acid being selected from the group consisting of phosphoric acid, boric acid, molybdic acid, phosphomolybdic acid, tungstic acid, and sulfuric acid, and a material selected from the group consisting of an aluminosilicate, activated alumina, aluminum sulfate, silicic acid, colloidal silica, silica gel, phosphorus pentoxide, copper sulfate, ammonium acid phosphate and calcium chloride, treating said sintered mixture with an inorganic acid as above defined, and resintering the so-treated sintered material.

4. The method as defined in claim 3, employing a hydrous metal oxide selected from the group consisting of insoluble hydrous oxides of zirconium, titanium, antimony, tungsten, silicon, scandium, bismuth, vanadium, molybdenum, chromium, and aluminum.

5. The method as defined in claim 3, employing an insoluble acid salt selected from the group consisting of zirconium phosphate, zirconium sulfate, titanium molybdate, titanium phosphate, tin phosphate and thorium phosphate.

6. The method of forming a high strength ion conducting membrane which comprises sintering at temperatures between about 200 and about 1,000° C., a substance selected from the group consisting of water insoluble hydrous metal oxides and water insoluble acid salts, an inorganic acid when said substance is said hydrous metal oxide, and a material selected from the group consisting of an aluminosilicate, activated alumina, aluminum sulfate, silicic acid, colloidal silica, silica gel, phosphorus pentoxide, copper sulfate, ammonium acid phosphate and calcium chloride, said material being present in an amount of about 1 to about 60% by weight of the total composition, treating said sintered material with an inorganic acid in an amount of about 1 to about 20% by weight of said sintered material, and resintering the so-treated sintered material at temperatures between about 200 and about 1,000° C.

7. The method of forming a high strength fuel cell membrane which comprises sintering at temperatures between about 200 and about 1,000° C., a mixture of about 10 to about 80 parts by weight of a substance selected from the group consisting of water insoluble hydrous metal oxides and water insoluble acid salts, about 10 to about 50 parts by weight of an inorganic acid when said substance is said hydrous metal oxide, and about 5 to about 50 parts by weight of a material selected from the group consisting of an aluminosilicate, activated alumina, aluminum sulfate, silicic acid, colloidal silica, silica gel, phosphorus pentoxide, copper sulfate, ammonium acid phosphate and calcium chloride, substantially saturating said sintered mixture with an inorganic acid, and resintering the so-treated sintered material at temperatures between about 200 and about 1,000° C.

8. The method as defined in claim 7, employing a hydrous metal oxide selected from the group consisting of insoluble hydrous oxides of zirconium, titanium, antimony, tungsten, silicon, scandium, bismuth, vanadium, molybdenum, chromium, and aluminum.

9. The method as defined in claim 8, wherein said inorganic acid is selected from the group consisting of phosphoric acid, boric acid, molybdic acid, phosphomolybdic acid, tungstic acid, and sulfuric acid.

10. The method as defined in claim 9, wherein said sintering and resintering are carried out at temperatures between about 300 and about 600° C.

11. The method of forming a high strength fuel cell membrane which comprises sintering at temperatures between about 300 and about 600° C. a mixture of about 10 to about 80 parts by weight of hydrous zirconium dioxide, about 10 to about 50 parts by weight of phosphoric acid based on 100% acid, and about 5 to about 50 parts by weight of an aluminosilicate, treating said sintered mixture with phosphoric acid, and resintering at temperatures of about 300 to about 600° C. the so-treated sintered material.

12. The method of forming a high strength fuel cell membrane which comprises sintering at temperatures between about 300 and about 600° C. a mixture of hydrous zirconium dioxide, phosphoric acid, and an aluminosilicate in about 1:1:1 proportions by weight, treating said sintered material with phosphoric acid in an amount of about 1 to about 20% by weight of said sintered material, and resintering at temperatures of about 300 to about 600° C. the so-treated sintered material.

References Cited
UNITED STATES PATENTS

| | | | |
|---|---|---|---|
| 3,265,536 | 8/1966 | Miller et al. | 136—86 |
| 3,266,940 | 8/1966 | Caesar | 136—86 |
| 3,276,910 | 10/1966 | Grasselli et al. | 136—86 |

WINSTON A. DOUGLAS, Primary Examiner

D. L. WALTON, Assistant Examiner

U.S. Cl. X.R.

136—146, 148; 210—502; 252—63.5